United States Patent [19]

Tung

[11] Patent Number: 4,737,423
[45] Date of Patent: * Apr. 12, 1988

[54] CATHODE ACTIVE MATERIAL FOR METAL OF CFX BATTERY

[75] Inventor: Hsueh S. Tung, Williamsville, N.Y.

[73] Assignee: Allied Corporation, Morris Township, N.J.

[*] Notice: The portion of the term of this patent subsequent to Jul. 21, 2004 has been disclaimed.

[21] Appl. No.: 932,984

[22] Filed: Nov. 20, 1986

Related U.S. Application Data

[63] Continuation-in-part of Ser. No. 814,470, Dec. 30, 1985, abandoned.

[51] Int. Cl.[4] .................... H01M 4/36; H01M 10/40
[52] U.S. Cl. ...................................... 429/194; 429/218
[58] Field of Search ................................ 429/218, 194

[56] References Cited

U.S. PATENT DOCUMENTS 4,578,327 3/1986 Saito et al. ........................... 429/218

Primary Examiner—Donald L. Walton
Attorney, Agent, or Firm—Jay P. Friedenson

[57] ABSTRACT

Improved fluorinated carbon made from an amorphous carbon or heat treated amorphous carbon having a lattice constant ($d_{002}$) of 3.37Å or greater for use as a positive electrode of a battery is provided. Such improved fluorinated carbon has low free oxidizing power, high utility factor and high capacity upon discharge in a Li/CF$_x$ battery. The free oxidizing power is found to be dependent on reaction temperature; the higher the fluorination temperature the lower the free oxidizing power. Low free oxidizing power is obtained at reaction temperatures of at least 460° C. Residual free oxidizing power can be further reduced by washing with an alkanol. Such alkanol wash can also be used to reduce free oxidizing power in fluorinated carbons prepared at lower temperatures.

18 Claims, 2 Drawing Sheets

CATHODE ACTIVE MATERIAL FOR METAL OF CFX BATTERY

This application is a continuation-in-part of Ser. No. 814,470 filed Dec. 30, 1985 by the same inventor and now abandoned.

DESCRIPTION

This invention relates to an improvement in fluorinated carbon, made from amorphous carbon or heat treated amorphous carbon having a lattice content ($d_{002}$) of 3.37Å or greater, useful as an active material for the positive electrode of a non-aqueous battery against a negative electrode of an active metal, such as lithium, sodium or potassium. The improved fluorinated carbon has less adsorbed fluorine in its lattice. Hence, the battery composed of this fluorinated carbon exhibits improved shelf life, high discharge capacity and excellent utility factor.

BACKGROUND OF THE INVENTION

Fluorinated carbon is known by the formula $(CF_x)_n$, where x is a number between 0 and 2 and n is an indefinite number greater than 2. Hereafter, $(CF_x)_n$ is abbreviated as $CF_x$. Fluorinated carbon is prepared from the reaction of fluorine gas with a crystalline or amorphous carbon. Graphite is a highly crystalline form of carbon. Amorphous carbon, such as petroleum coke, coal coke, carbon black and activated carbon, has a low degree of crystallinity in its structure. However, the degree of crystallinity in amorphous carbon can be increased by heat treatment at high temperatures.

The lattice constant ($d_{002}$), representing the interlayer spacing between the two carbon layers, is a characteristic parameter for the degree of crystallinity of the carbon. A lattice constant ($d_{002}$) is determined by the x-ray diffraction method using the $K\alpha$ line of copper (Cu) and calculated from Bragg's equation:

$$d_{002} = \frac{\eta\lambda}{2\sin\theta}$$

where $\lambda$ is the wavelength of the $K\alpha$ line, $\eta$ is a positive integer and, $\theta$ is the diffraction angle.

In the prior art, for example, U.S. Pat. No. 4,271,242 and the publication Nikon Kagaku Zasshi (1974, No. 6, page 1033), it is indicated that the lattice constant ($d_{002}$) decrease with increase of heat treatment temperature. In other words, the degree of crystallinity of carbon increases with the increase of heat treatment temperature and the decrease of the lattice constant ($d_{002}$). The commercially available coke has a lattice constant ($d_{002}$) between 3.44 and 3.49Å. When such a coke is heat treated at a temperature above 2,000° C., its lattice constant ($d_{002}$) decreases to 3.39 or less. When heat treatment temperature reaches 3,000° C. or more, the coke is considered to be completely graphitized. A pure graphite has a lattice constant ($d_{002}$) of 3.354Å.

One of the major applications of fluorinated carbon is in its use as a positive electrode in combination with a lithium or other active metal to give a battery of high energy density. For such applications, fluorinated carbon which is derived from amorphous carbon such as coke is preferred for use because it can be prepared in relatively high yields at relatively low temperatures and this is more economical than fluorinated carbon which is prepared from graphite which requires higher temperatures to obtain relatively high fluorine content. Thus, fluorination reaction temperatures used for amorphous carbon are, to my best knowledge and belief kept below about 450° C. (See U.S. Pat. No. 4,271,242). Although amorphous carbon may have been fluorinated at temperatures above 450° C. to the best of my knowledge, no such fluorinated carbon material has been sold or publicly used in a metal/$CF_x$ battery.

For the purpose of this invention, amorphous carbon will be defined as carbon with a lattice constant ($d_{002}$) of 3.37Å or greater. This is intended to distinguish over pure graphite which, as indicated above, has a lattice constant of 3.354Å.

In the aforementioned U.S. Pat. No. 4,271,242, fluorinated carbon obtained by fluorinating amorphous or heat treated amorphous carbon contains a large amount of adsorbed fluorine which causes high initial voltage and poor shelf life in the non-aqueous Li/$CF_x$ battery. See, for example, column 6, line 50 to columns 7 and 8 of that patent. The batteries composed of fluorinated carbon made from high temperature heat treated coke show low capacity and small utility factor before and after storage as shown in Tables II and III in the aforementioned U.S. Pat. No. 4,271,242.

A need exists for an improved fluorinated carbon made from amorphous carbon or heat treated amorphous carbon to be free of the above drawbacks.

SUMMARY OF THE INVENTION

In accordance with the invention, fluorinated carbon obtained from fluorinating amorphous carbon or heat treated amorphous carbon having a lattice constant ($d_{002}$) of 3.37Å or greater can be made to have low free oxidizing power, high utility factor and high capacity upon discharge in a Li/$CF_x$ battery. The free oxidizing power in the fluorinated carbon is found to be dependent on the reaction temperature; the higher the fluorination temperature the lower the free oxidizing power. When fluorination is conducted at a temperature equal to or higher than 460° C., the free oxidizing power is improved compared to results obtained at lower temperatures. In the case of the fluorinated carbon having a residual detectable free oxidizing power after such reaction, the free oxidizing power can be further reduced to an undetectable level by washing with an alkanol. Moreover, such alkanol wash can also be used to reduce free oxidizing power in fluorinated carbons prepared at low temperatures. The fluorinated carbon made under the conditions of the present invention show a high utility factor (greater than 89%).

DESCRIPTION OF THE PREFERRED EMBODIMENTS

In accordance with the present invention, the free oxidizing power of a fluorinated carbon obtained from an amorphous carbon or heat treated amorphous carbon with a lattice constant ($d_{002}$) of 3.37Å or greater can be reduced to low or undetectable levels for metal/$CF_x$ non-aqueous batteries. The free oxidizing power is found to be dependent primarily on the reaction temperature; the higher the fluorination temperature, the lower the free oxidizing power. The free oxidizing power, contributed mainly from the adsorbed fluorine, may be determined by using iodimetry. The iodimetry method is described below.

For a typical run, 0.5 g of fluorinated carbon is brought into contact with 15 ml. ethanol and 20 ml. of 0.5 N KI solution for a minimum of 30 minutes. The mixture is shaken vigorously and then filtered. Ten ml. of the filtrate are diluted with 10 ml. of water and titrated with 0.01 N $Na_2S_2O_3$ and 3 drops of starch indicator. The free oxidizing power is determined as:

$$\text{Wt. \% } F = \frac{0.019 (A - B) (3.5) (0.01)}{0.5} \times 100$$

Figure 1:
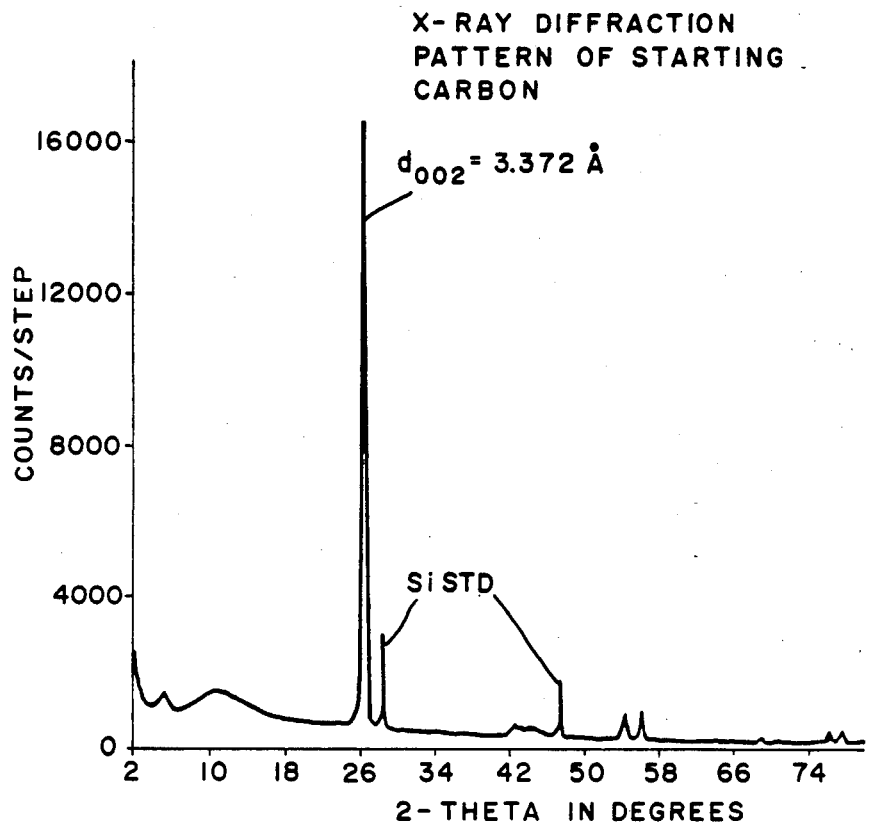
FIG. 1 shows the x-ray diffraction pattern of a starting material in accordance with this invention.

A = Volume of titrant required in ml.
B = Volume of titrant required in ml. for a blank
3.5 = dilution factor In the case of a $CF_x$ made by fluorinating amorphous carbon at a relatively low temperature, e.g. 400° C. or less, the free oxidizing power can be as high as 1% or more. However, when the fluorination temperature is increased, the free oxidizing power of the $CF_x$ is reduced. To further demonstrate the invention, a coke which is made (heat treated) at 2500° C. and is available commercially as Desulco® from Superior Graphite Corporation, is fluorinated at different temperatures. As a result of the high temperature process by which the coke is made, it has a lattice constant ($d_{002}$) of 3.372Å. FIG. 1 shows the x-ray diffraction pattern using silicon as an internal standard. When this coke was fluorinated at 400° C., according to the conditions disclosed in the aforementioned prior art U.S. Pat. No. 4,271,242, the free oxidizing power of the $CF_x$ was 1.37 wt. % F. This $CF_x$ powder changed the color of organic electrolyte, such as γ-butyrolactone with 1 M $LiBF_4$, from clear to brown after storage at room temperature and 60° C. for one month and two weeks respectively. The brown organic electrolyte darkened the color of lithium surface at room temperature in one day, suggesting that the high free oxidizing power destabilized the organic electrolyte. Consequently, it would reduce the shelf life of Li/$CF_x$ battery. In a commercial battery of Li/$CF_x$, the high free oxidizing power could also cause formation of titanium fluoride on the surface of titanium grid used as current collector. The formation of titanium fluoride would increase electrical resistance of the current collector and consequently reduce the capacity and shelf life of the battery.

However, when the fluorination temperature of this coke with a ($d_{002}$) of 3.372Å was increased to 460° C., the free oxidizing power was reduced drastically. The decrease of the free oxidizing power of $CF_x$ with the gradual increase of fluorination temperature from 450° to 540° C. is shown in Table 1. At a temperature of 480° C. or higher, the free oxidizing power was reduced even more significantly. At a temperature greater than 540° C., the free oxidizing power of the $CF_x$ became undetectable. The preferred fluorination temperature in accordance with this invention is accordingly at least 480° C., and most preferably at least 540° C. In the case of the fluorinated carbon made at relatively low temperature, such as 450° C. (entry No. 1; Table 1), the relatively high free oxidizing power (0.04 wt. % F) can be washed to an undetectable level (less than 0.002%) by using 95% ethanol (entry No. 2, Table 1).

When the fluorinated carbons made at temperatures above 460° C. from a carbon with lattice constant ($d_{002}$) of 3.37Å or greater were tested in a non-aqueous Li/$CF_x$ cell, each showed a flat discharge curve with good capacities. No high initial voltage as described in line 10, column 7 and FIGS. 3 and 4 in the aforementioned U.S. Pat. No. 4,271,242, was observed. The voltage of the test cell at 50% depth of discharge decreases with the increase of fluorination temperature. The specific capacity increases slightly with increase of temperature. All the fluorinated carbons made under the conditions of this invention show good utility factor (greater than 89%).

Figure 2:
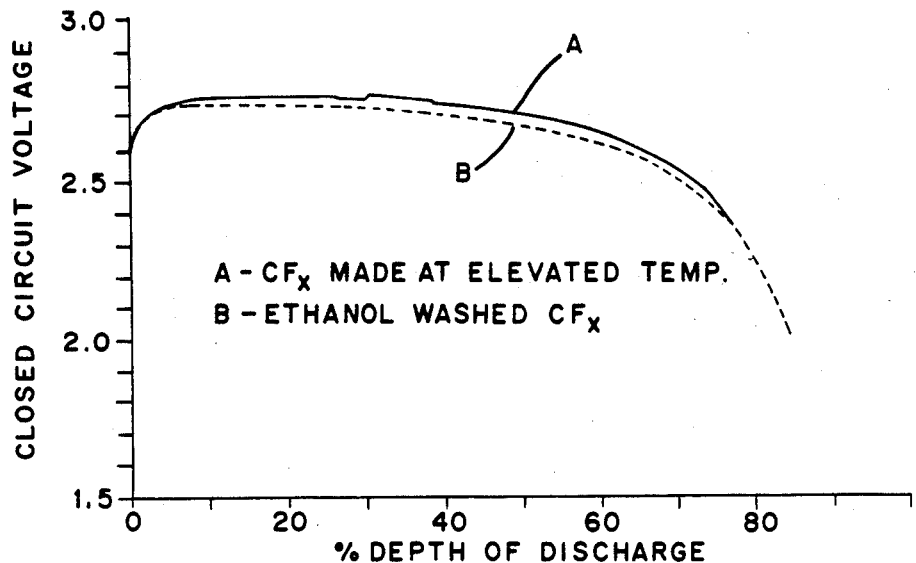
FIG. 2 illustrates the discharge curve of a battery using a fluorinated carbon at a temperature of 450° C. without ethanol wash (Curve A) and in accordance with one embodiment of the invention, with ethanol wash (Curve B).

FIG. 2 provides an example of the discharge curve of the fluorinated carbon at 450° C. before and after ethanol wash. It shows that ethanol can wash away the free oxidizing power, which is detrimental to battery's shelf life, without giving away adverse effect to its electrical performance. Any alkanol may be used for this alcohol wash. Preferred alkanols contain 1-3 carbon atoms. Still preferred, the alkanol wash contains a reducing agent such as a metal iodide.

Figure 3:
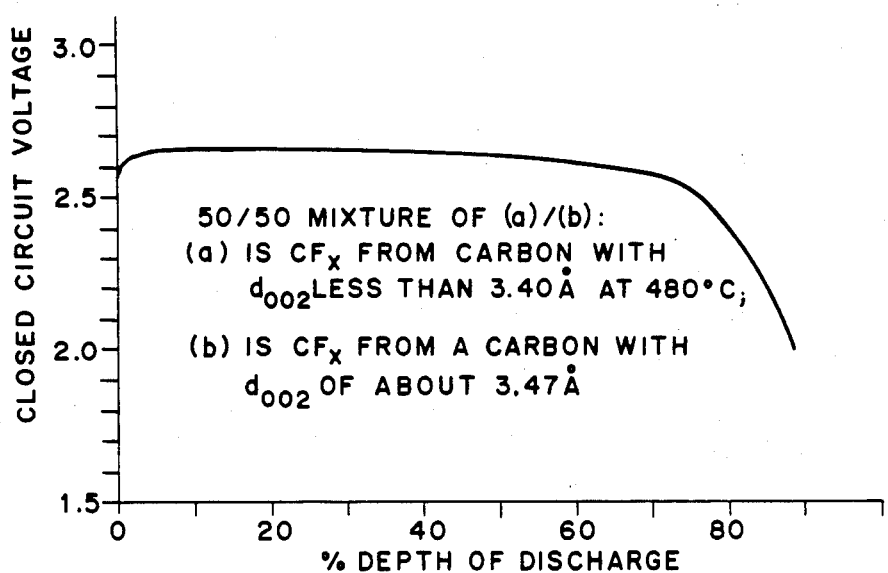
FIG. 3 illustrates the discharge curve of a battery using a mixture of 50/50 fluorinated carbons. One of the components is a fluorinated carbon prepared in accordance with this invention at 480° C.

In order to further demonstrate the good electrical performance of the $CF_x$ made under the conditions of this invention, the $CF_x$ made at 480° C. (entry No. 4, Table 1) was mixed with 50 wt. % of $CF_x$ made from a coke with a ($d_{002}$) of 3.47Å, which is indicated in U.S. Pat. No. 4,271,242 as having excellent discharge and shelf life characteristics. This mixture was tested in the same Li/$CF_x$ cell. The discharge curve at a current density of about 0.36 mA/cm$^2$ is shown in FIG. 3. The discharge curve is very flat with excellent capacity.

The invention will be further described by the following specific examples. It should be understood, however, that although these examples may describe in detail certain preferred operating conditions of the invention, they are given primarily for purposes of illustration and the invention in its broader aspects is not limited thereto.

EXAMPLES 1-6

Fluorination of Carbon

One gram of carbon with lattice constant 3.372Å, (a commercial coke available under the brand name Desulco® from Superior Graphite Co.) was placed in a nickel boat inside a Monel tube reactor. The temperature of the reactor was raised to 200° C. under a nitrogen flow of 50 cc/min. for a few minutes. Fluorine gas was then introduced at this temperature at a flow rate of 9 cc/min. Once the fluorine was detected at the outlet of the reactor with KI paper, the reaction was brought up to the desired temperature, e.g. 450° C. or 480° C. etc. The reaction took about 7 to 9 hours. The fluorinated carbon obtained has a brownish gray color. The color of the fluorinated carbon became whiter as temperature increased. The entries in Table 1 reflect this procedure with temperature changed.

EXAMPLE 7

In a typical run, two grams of $C_{Fx}$, made at 450° C. as in Example 1, were placed in a thimble inside a Soxlet extractor. Three hundred cc of 95% ethanol (5% water) were used to extract this $CF_x$ for 2 to 5 days. The resulting $CF_x$ was dried in air at room temperature. The iodimetry test shows the free oxidizing power was less than 0.002%.

EXAMPLE 8

(Battery Test)

In a typical test, one gram of $CF_x$ was used to mix with 12 wt. % of Acetylene Black (Shawinigan Black obtainable commercially from Gulf Oil Chemical Co.) and 3 wt. % of PTFE. The Shawinigan Black is used as a conducting carbon, whereas PTFE a binder. The homogenized mixture was pressed into a cathode pellet sealed into cell with an excess amount of lithium foil as an anode and a polypropylene separator. An organic mixture of propylene carbonate and dimethoxy ethane (50/50) with 1M LiBF4 was used as an electrolyte. The battery was discharged across a constant 10 Kohm load. The current density at 50% depth of discharge was approximately 0.36 mA/cm².

A typical discharge curve is shown in FIG. 2.

TABLE 1

$CF_x$ MADE FROM CARBON WITH LATTICE CONSTANT ($d_{002}$) of 3.372Å

| No. | F. Temp. (C.°) | % F in $CF_x$ | FOP** F % | CCV*** 50% DOD |
|---|---|---|---|---|
| 1 | 450° | 57 | 0.04 | 2.70 |
| 2 | —* | 57 | <0.002 | 2.67 |
| 3 | 460 | 57 | 0.03 | 2.68 |
| 4 | 480 | 58 | 0.01 | 2.62 |
| 5 | 500 | 58 | 0.01 | 2.56 |
| 6 | 540 | 57 | <0.002 | 2.46 |

| No. | 10 Kohm Load mAH/g | 10 Kohm Load MWH/g | UTILITY FACTOR (%) |
|---|---|---|---|
| 1 | 727 | 1918 | 90 |
| 2 | 725 | 1900 | 90 |
| 3 | 724 | 1899 | 89 |
| 4 | 732 | 1881 | 90 |
| 5 | 739 | 1856 | 90 |
| 6 | 750 | 1819 | 93 |

*NOTE: ethanol washed
**FOP: free oxidizing power
***CCV: closed circuit voltage: DOD: depth of discharge It will be understood that a great variety of products may be made within the ranges disclosed herein; and therefore, the invention is not intended to be limited, except as set forth in the claims which follow.

I claim:

1. In a battery having a non-aqueous electrolyte, a fluorinated carbon cathode and a metal anode selected from the group consisting of lithium, sodium, potassium and zinc, the improvement comprising utilizing a fluorinated carbon in which the fluorinated carbon has been produced by fluorinating carbon or heat treated carbon having a lattice constant ($d_{002}$) of 3.37Å or greater at a temperature of at least 460° C. and washing with an alkanol.

2. The battery of claim 1 in which the fluorinated carbon is produced from heat treated carbon having a lattice constant ($d_{002}$) of 3.37Å or greater.

3. The battery of claim 2 in which the metal anode is lithium.

4. The battery of claim 1 in which the fluorinated carbon is produced at a temperature of at least 480° C.

5. The battery of claim 1 in which the fluorinated carbon is produced at a temperature of at least 540° C.

6. The battery of claim 4 or 5 wherein the fluorinated carbon is produced from heat treated carbon having a lattice constant of ($d_{002}$) of 3.37Å or greater.

7. The battery of claim 6 wherein the fluorinated carbon has been washed with an alkanol containing 1-3 carbon atoms.

8. The battery of claim 1 in which the metal anode is lithium.

9. The battery of claim 1 wherein 40% to 97% by weight of another and different fluorinated carbon made from carbon having a lattice constant between 3.40 and 3.50Å is combined with the said fluorinated carbon.

10. The battery of claim 1 wherein the alkanol contains 1-3 carbon atoms.

11. The battery of claim 10 wherein the alkanol wash contains a reducing agent.

12. The battery of claim 11 wherein the reducing agent is a metal iodide.

13. In a battery having a non-aqueous electrolyte, a fluorinated carbon cathode and a metal anode selected from the group consisting of lithium, sodium, potassium and zinc, the improvement comprising utilizing a fluorinated carbon in which a fluorinated carbon possessing measurable free oxidizing power has been washed with an alkanol.

14. The battery of claim 13 in which the fluorinated carbon is further characterized by being produced by fluorinating carbon or heat treated carbon having a lattice constant ($d_{002}$) of 3.37Å or greater.

15. The battery of claim 14 in which the fluorinated carbon is produced from heat treated carbon having a lattice constant ($d_{002}$) of 3.37Å or greater.

16. The battery of claim 15 wherein the metal anode is lithium.

17. The battery of claim 16 in which the alkanol wash contains a reducing agent.

18. The battery of claim 17 in which the reducing agent is a metal iodide.

* * * * *